United States Patent [19]
McMillen

[11] 3,823,976
[45] July 16, 1974

[54] LATCH MECHANISM

[75] Inventor: Russell G. McMillen, Fort Wayne, India

[73] Assignee: International Harvester Company, Chicago, Ill.

[22] Filed: May 1, 1972

[21] Appl. No.: 248,841

[52] U.S. Cl.............. 296/35 R, 180/89 A, 292/122
[51] Int. Cl............................................. B62d 27/06
[58] Field of Search............. 296/28 C, 35 R, 35 A; 180/89 A; 292/122, 99, 125, DIG. 19

[56] References Cited
UNITED STATES PATENTS

| | | | |
|---|---|---|---|
| 2,507,196 | 5/1950 | Dall | 292/99 |
| 3,065,986 | 11/1962 | Barker et al. | 292/99 X |
| 3,400,970 | 9/1968 | Daniluk | 180/89 A |
| 3,659,886 | 5/1972 | Andrews | 292/DIG. 49 |
| 3,701,563 | 10/1972 | Lasko et al. | 296/35 A |

FOREIGN PATENTS OR APPLICATIONS

| | | | |
|---|---|---|---|
| 1,070,941 | 6/1967 | Great Britain | 180/89 A |

Primary Examiner—David Schonberg
Assistant Examiner—John A. Pekar
Attorney, Agent, or Firm—Frederick J. Krubel; Floyd B. Harman

[57] ABSTRACT

A latch mechanism for latching a movable body structure, such as a tilting truck cab, to a fixed body structure, such as a truck chassis, including a pivotally mounted latch lever engageable with a latch bracket, the latch lever being held in position by an over-center spring and adapted to be released by a lever-actuated cable attached thereto.

6 Claims, 9 Drawing Figures

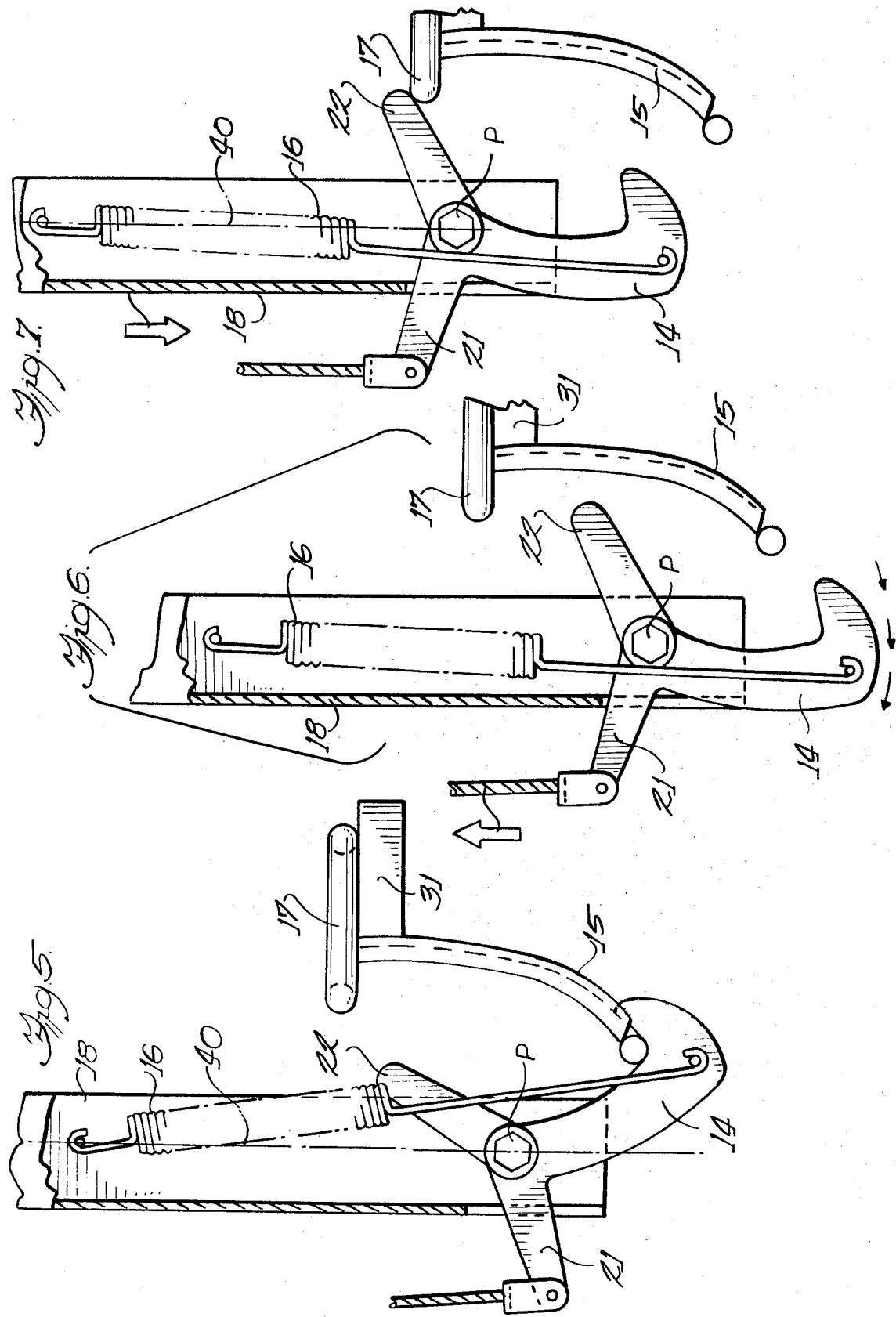

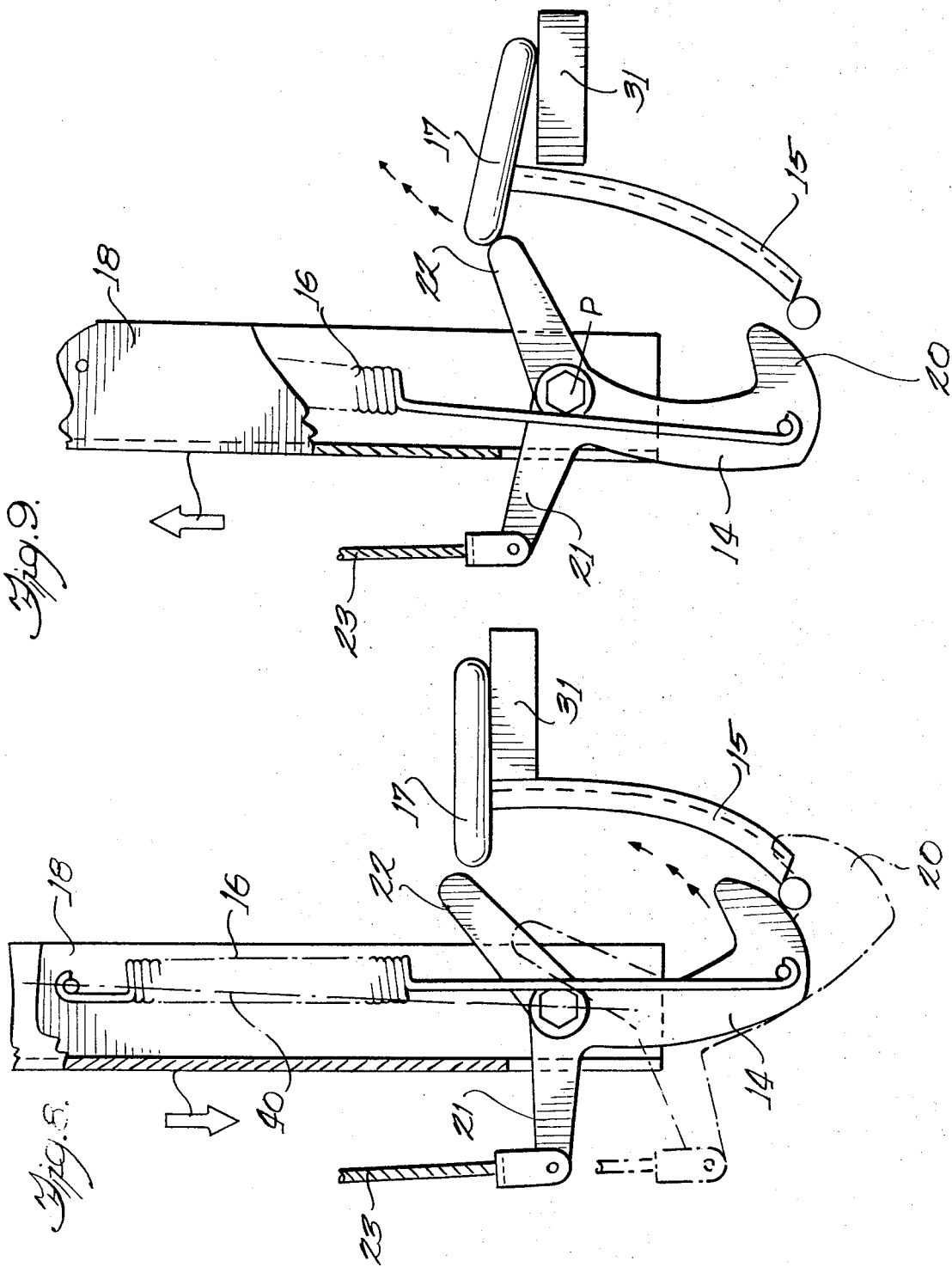

LATCH MECHANISM

BACKGROUND OF THE INVENTION

This invention relates generally to latch mechanisms, and more particularly, to a latch mechanism for securing the rear portion of a tilt type cab to a fixed truck chassis.

In the past various latch mechanisms have been developed which have suffered from a variety of deficiencies such as being complicated in structure, having an excessive number of parts, and not being easily releasable. It is, therefore, a purpose of this invention to provide a low cost latching mechanism easily usable on a tilting truck cab which is releasable by means of a single lever release mechanism positioned in the truck cab convenient to the driver and which also is of the automatic latching type.

SUMMARY OF THE INVENTION

Briefly summarized, the latching mechanism herein comprises a latch lever, pivotally mounted on a portion of the cab structure and engageable with a latch bracket and held in engagement with the latch bracket by an over-center spring. The latch lever is operable from a remote position through a lever actuated cable attached thereto. Actuation of the latch lever is effective to pivot the latch lever against the tension of the over-center spring to disengage it from the latch bracket. The latching mechanism is equipped with a striker bar which is effective during resecuring of the cab to the truck frame to coact with an arm extension of the latch lever to move the latter back to a latching position.

Other objects and advantages of this invention will become more apparent from a consideration of the description herein considered in connection with the drawings.

DESCRIPTION OF THE DRAWINGS

FIG. 5 is a view showing the latch lever in a latched position;

FIG. 6 is a view showing the latch lever actuated to an unlatched position as the cab is being raised or tilted upwardly;

FIGS. 7 and 8 are views showing the latch lever in a released position as the cab is being lowered and proceeding through an over-center position to a latching position;

FIG. 9 is a view showing the latch lever in a released condition as the cab is being raised.

DESCRIPTION OF THE PREFERRED EMBODIMENT

Figure 1:
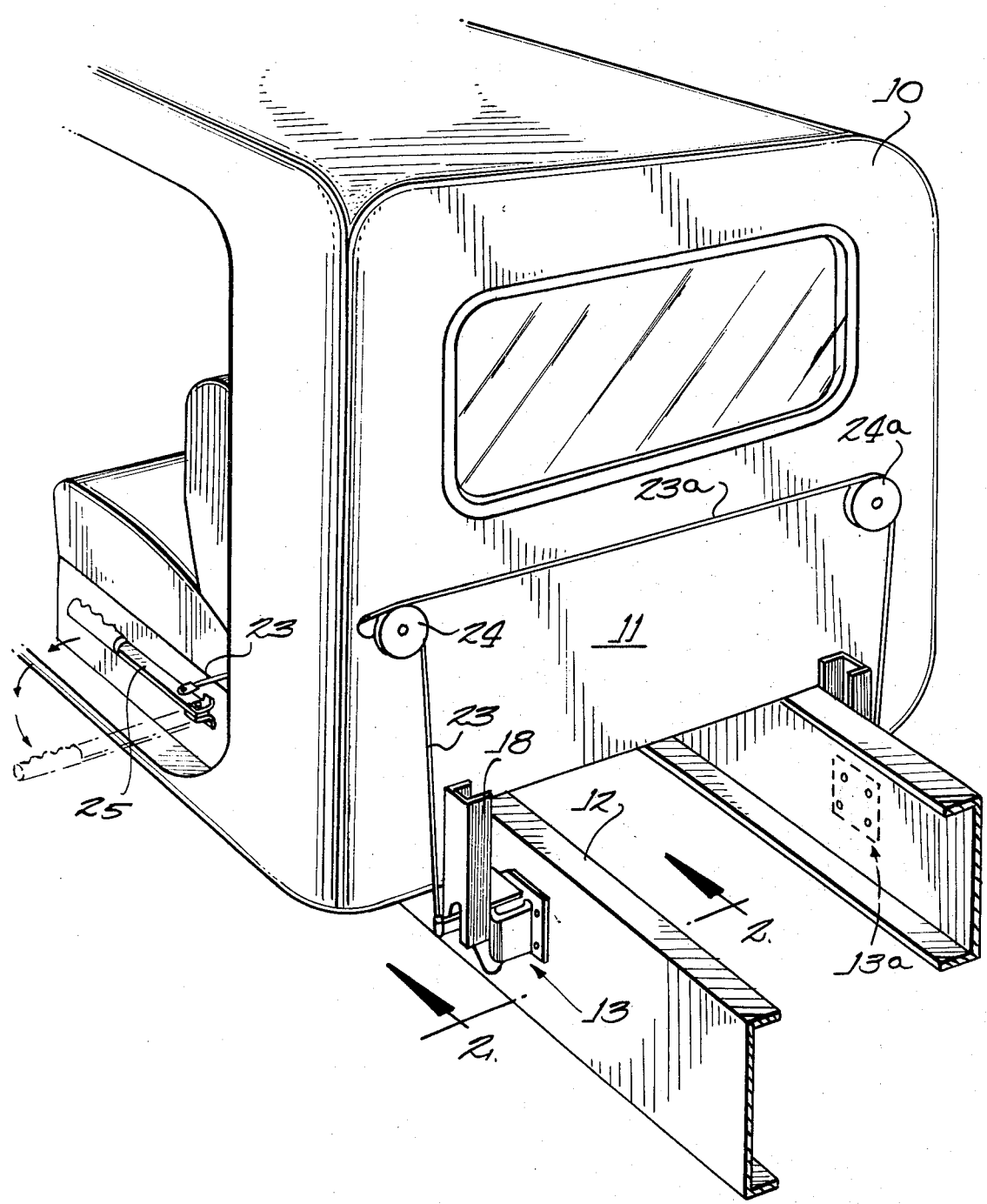
FIG. 1 is a perspective view of a portion of a tilt type cab and a portion of a truck chassis interconnected by the latching mechanism embodying the invention herein.

Referring now to the drawings wherein like reference characters, in the different views, refer to similar parts, FIG. 1 shows a tilt type cab 10, having a rear portion 11, which is latched to a fixed frame assembly 12 of a truck chassis by a latch mechanism 13. A similar latching mechanism to 13 is symmetrically disposed on the right side of the frame assembly as indicated at 13a.

Figure 2:
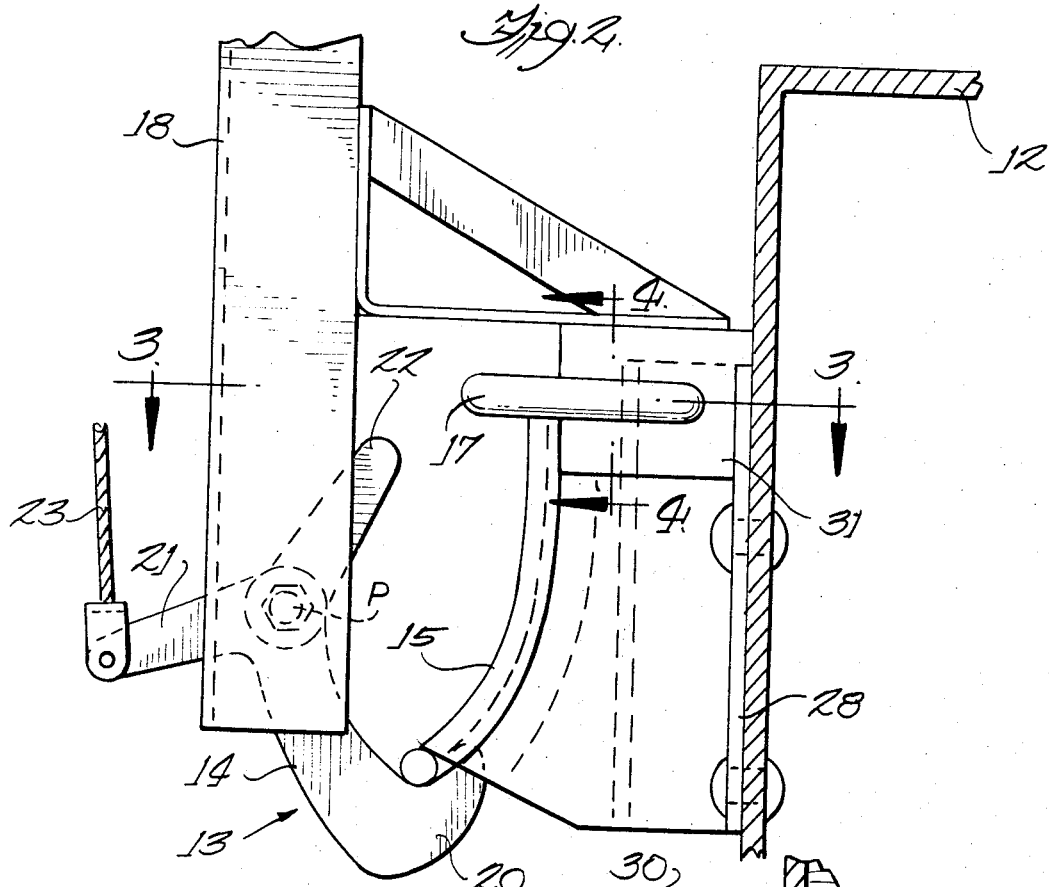
FIG. 2 is a view of the latch mechanism taken along line 2—2 of FIG. 1.

The latch mechanism 13 comprises a latch lever 14, a latch bracket 15, an over-center spring 16 and a striker member 17. The latch lever 14 is pivotally mounted on a vertical support member 18 by means of a horizontal shoulder bolt 19. The member 18 is attached to the cab structure 10. The latch lever 14 is formed at its lower end with a hook portion 20 for engaging the lower end of the latch bracket 15. The latch lever 14 also has formed integrally therewith at its upper end two arms 21 and 22 to thereby form a substantially "Y" shaped configuration. An actuating cable 23, is attached to the outer extremity of arm 21 and is led over a pulley 24 to an actuating lever 25 which is mounted on the cab structure convenient to the operator of the truck cab. Operation of the lever 25 from the position shown in a solid line to the position shown in a dotted line is effective to release the latch lever 13 from an engaged position by rotating it clockwise as viewed in FIG. 2.

The latch bracket 15 is bonded to, and molded in, an elongated support member 26, which is secured to the frame assembly 12 of the truck chassis by means of a pair of elongated mounting brackets 27 and 28 which are embedded in the support member and secured to the fixed frame assembly 12 by suitable means such as bolts. The latch bracket 15 may comprise a substantially "U" shaped channel iron, the lower end of which is bent outwardly and adapted to be engaged by the hook portion 20 of the latch lever 14.

The supporting member 26 preferably is a hard rubber material which will also be effective as a shock absorbing material. The supporting member 26 is integrally formed at its upper end with laterally extending ledge support portions 30 and 31.

Figure 3:
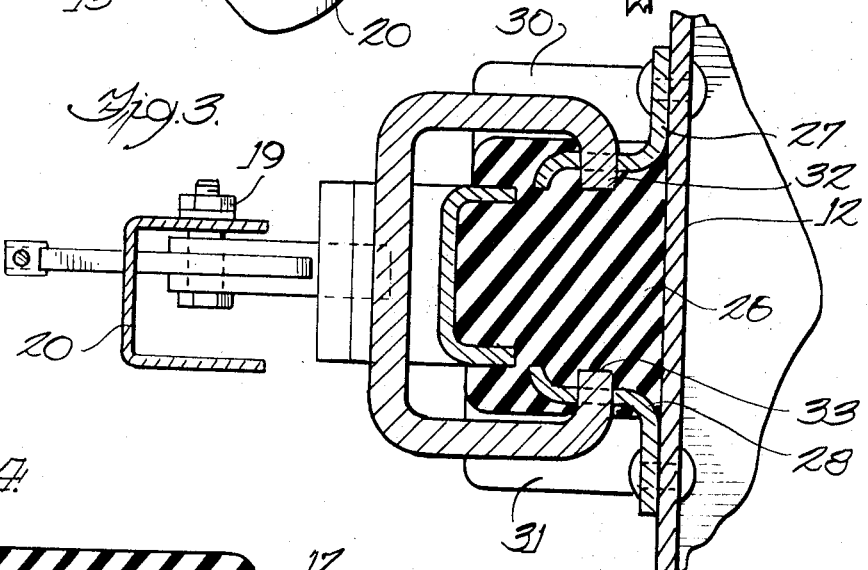
FIG. 3 is a view of the latching mechanism taken along line 3—3 of FIG. 2.
Figure 4:
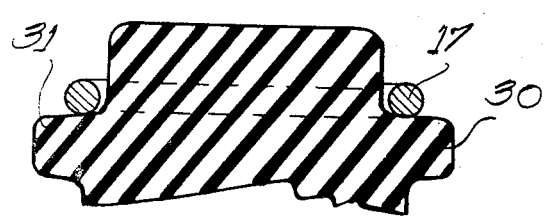
FIG. 4 is a view taken along the line of 4—4 of FIG. 2.

The striker member 17 comprises a substantially U shaped member having inturned end portions 32 and 33 for pivotally mounting in the chassis mounting brackets 27 and 28. The ledge portions 30 and 31 of the supporting member 26 provide support or stop means for the striker member 17 as seen in FIGS. 3 and 4 thus allowing the striker member 17 to pivot upwardly only as seen in FIG. 9 and not downwardly. In effect, the ledge portions 30, 31 limit pivotal movement of the striker member 17 in a counterclockwise direction and support the striker member 17 in or substantially horizontal position, as viewed in FIG. 2.

The over-center enlongated tension spring 16 has its upper end pivotally attached to the vertical member 18 at a point spaced from the pivot point P of the latch lever 14 and its lower end pivotally attached to the latch lever 14 at a point on the hook portion 20 of the latch lever 14 and spaced on the opposite side of pivot point P from the pivotal connection of the spring 16 to the vertical member 18.

From the foregoing, it will be appreciated that one end of the spring 16 is, in effect, fixed with respect to the pivot point P while the opposite end, being movable with the latch lever 14, is relatively movable with respect to the pivot point P.

The operation of the latch mechanism will now be described. When it is desired to release the latch mechanism so that the truck cab can be tilted upwardly from its normally lowered position shown in FIGS. 1 and 5 to its fully raised or tilted position, the operator manipulates the actuating lever 25 from its normal position, corresponding to the latched position of the latch lever 14, to the latch released position, corresponding to the unlatched position of the latch lever 14, shown in dotted lines in FIG. 1. Through the attached cable 23 the latch lever 14 is disengaged from the latch bracket 15 by rotating it clockwise from the latching position shown in FIG. 5 to the unlatched position shown in FIG. 6 against the resilient force exerted by the spring 16. During this movement of the latch lever 14 it will be observed that the spring 16 is moved through its over-center position, wherein the longitudinal axis of the spring 16 passes through the pivot point P, and the spring 16 now yieldably retains the latch lever in such unlatched position. The over-center position is indicated by the line 40 drawn through the upper anchoring point of the spring 16 and the pivot point P of the latch lever 14. In the meantime the lever 25, which may be equipped with a return spring of any suitable type, is returned automatically to its normal position alongside the seat without any effect on the unlatched position of the latch lever 14. Then as the truck cab is tilted upwardly, the arm 22 attached to the latch lever will engage the striker member 17 to pivot it upwardly as shown in FIG. 9. As soon as the arm 22 has passed the striker member the latter will fall back into its normal horizontally disposed rest position on the ledge portions 30 and 31. It will be appreciated from the foregoing that the striker member 17 does not interfere with the raising or tilting operation of the cab.

When the cab is lowered to be relatched in place, it moves through the positions shown in FIGS. 7 and 8. In that movement the arm 22 formed on the latch lever 14 strikes the striker member 17 since the striker member 17 when in its normal rest position is in the path of movement of the arm 22 as the cab is lowered. Since the latter is not movable downwardly from its normal rest position on the ledges 30 and 31 the latch lever 14 is rotated counterclockwise against the tension of spring 16 moving the spring 16 back over its over-center position to a latching position. As seen in FIG. 8 the curved underside of the hook portion 20 of the latch lever serves as a cam surface which engages the lower edge of the latch bracket 15 whereupon continued downward movement of the truck cab effects pivotal movement of the latch lever 14 against the biasing action of the spring 16 but such pivotal movement of the latch lever 14 is not so great as to cause the spring 16 to move over its over-center position, and thus upon further movement past the latch bracket the hook portion 20 of the latch lever snaps into place into the latching position as shown in FIG. 5 and into latching engagement with the lower outwardly bent end of the latch bracket. Thus it is seen that the latch mechanism functions to automatically relatch the truck cab to the fixed frame assembly simply by lowering the cab to its normal position from its forwardly tilted position without the necessity of manipulating the actuating lever 25.

The latching mechanism 13a, of course, is operated in a similar manner and coincidentally with the latch mechanism 13 through the cable 23a also connected to the lever 25.

While a preferred embodiment of the invention has been specifically disclosed, it is to be understood that the invention is not limited thereto as other variations will be apparent to those skilled in the art and the invention is to be given its fullest possible interpretation within the terms of the following claims.

I claim:

1. A latching mechanism associated with motor vehicle structures for releasably latching a relatively movable structure to a stationary structure, said movable structure being movable between a normally lowered position and a raised position, the combination comprising:

a latch lever having arm means fixed thereto;

means for pivotally supporting said latch lever on one of said vehicle structures whereby said latch lever is capable of swinging arcuately between an unlatched position and a latched position;

biasing means yieldably urging said latch lever toward its latched position during one half of its total arcuate travel and, alternatively, its unlatched position during the other half of its total arcuate travel;

support means secured to the other one of said vehicle structures;

a latch bracket secured to said support means, said latch bracket being operatively engageable with said latch lever when said latch lever is in its latched position and said movable strucutre is in its normally lowered position to latch said movable structure to said stationary structure;

manually operable means for effecting swinging arcuate movement of said latch lever from its latched position toward its unlatched position to permit said biasing means to yieldably urge said latch lever toward its unlatched position; and striker member means including a striker member mounted on said support means for relative movement, said striker member having a portion thereof disposed in the path of and engageable by said latch lever arm means whenever said latch lever is in its unlatched position during movement of said movable structure between its normally lowered and raised positions, said striker member being freely moved out of the path of said arm means when said striker member portion is engaged thereby during movement of said movable structure from its normally lowered position to its raised position, said striker member being restrained from moving out of the path of said arm means when said striker member portion is engaged thereby during movement of said movable structure from its raised position to its normally lowered position to thereby effect swinging arcuate movement of said latch lever from its unlatched position toward its latched position to permit said biasing means to yieldably urge said latch lever toward its latched position.

2. A latching mechanism as set forth in claim 1, wherein said striker member is supported on said support means for relative pivotal movement, said striker member being pivotally moved out of the path of said arm means when said striker member portion is engaged thereby during movement of said movable structure from its normally lowered position to its raised position, said striker member being incapable of pivoting out of the path of said arm means when said striker member portion is engaged thereby during movement of said movable structure from its raised position to its normally lowered position to thereby effect swinging arcuate movement of said latch lever from its unlatched position toward its latched position to permit said biasing means to yieldably urge said latch lever toward its latched position.

3. A latching mechanism as set forth in claim 1, wherein said support means includes bracket means fixed to said other one of said vehicle structures and a block of elastomer material operatively interposed between and bonded to said latch bracket and said bracket means; and wherein said striker member is pivotally connected to said bracket means and normally supported on said block of elastomer material in a normal position wherein a portion thereof is disposed in the path of and engageable by said latch lever arm means whenever said latch lever is in its unlatched position during movement of said movable structure between its normally lowered and raised position, said striker member being pivotally moved out of the path of said arm means and away from its normal position when said striker member portion is engaged thereby during movement of said movable structure from its normally lowered position to its raised position, said striker member being restrained from pivoting by portions of said block of elastomer material when said striker member portion is engaged by said arm means during movement of said movable structure from its raised position to its normally lowered position to thereby effect swinging arcuate movement of said latch lever from its unlatched position toward its latched position to permit said biasing means to yieldably urge said latch lever toward its latched position.

4. A latching mechanism as set forth in claim 3, wherein said biasing means includes an elongated, helically wound tension spring having one end pivotally connected to said one of the vehicle structures at a point spaced on one side of a horizontal plane containing the pivotal axis of said latch lever and its opposite end pivotally connected to said latch lever at a point spaced on the opposite side of said plane, the longitudinal axis of said spring intersecting the pivotal axis of said latch lever each time said latch lever is swung arcuately between its latched and unlatched positions.

5. A latching mechanism as set forth in claim 4, wherein said manually operable means includes a hand lever pivotally mounted on said one of the vehicle structures at a point remote from said latch lever, said hand lever being pivotal between a first position corresponding to the latched position of said latch lever and a second position corresponding to the unlatched position of said latch lever, and motion transmitting means extending between and operatively interconnecting said hand lever and latch lever whereby pivotal movement of said hand lever from its first position to its second position effects swinging arcuate movement of said latch lever from its latched position toward its unlatched position to permit said biasing means to yieldably urge said latch lever toward its unlatched position.

6. A latching mechanism as set forth in claim 1, wherein said biasing means includes an elongated, helically wound tension spring having one end pivotally connected to said one of the vehicle structures at a point spaced on one side of a horizontal plane containing the pivotal axis of said latch lever and its opposite end pivotally connected to said latch lever at a point spaced on the opposite side of said plane, the longitudinal axis of said spring intersecting the pivotal axis of said latch lever each time said latch lever is swung arcuately between its latched and unlatched positions.

* * * * *